(12) United States Patent
Bull et al.

(10) Patent No.: US 10,558,043 B2
(45) Date of Patent: Feb. 11, 2020

(54) WORN DISPLAY USING A PERIPHERAL VIEW

(71) Applicants: Ian J. Bull, Portland, OR (US); Alexander D. Reid, Tualatin, OR (US); Evan S. Marshall, Portland, OR (US)

(72) Inventors: Ian J. Bull, Portland, OR (US); Alexander D. Reid, Tualatin, OR (US); Evan S. Marshall, Portland, OR (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

(21) Appl. No.: 14/957,282

(22) Filed: Dec. 2, 2015

(65) Prior Publication Data
US 2017/0160546 A1 Jun. 8, 2017

(51) Int. Cl.
*G02B 27/01* (2006.01)

(52) U.S. Cl.
CPC .............................. *G02B 27/0172* (2013.01)

(58) Field of Classification Search
CPC G02B 27/0172; G02B 27/01; G02B 27/0123; G02B 27/014; G06T 3/20; G06T 3/40; G06F 3/012; G06F 3/013
See application file for complete search history.

(56) References Cited

U.S. PATENT DOCUMENTS

| | | | | |
|---|---|---|---|---|
| 2002/0101568 A1* | 8/2002 | Eberl | ................... | G02B 27/017 351/211 |
| 2004/0227703 A1* | 11/2004 | Lamvik | .............. | G02B 27/0172 345/76 |
| 2008/0079753 A1* | 4/2008 | Victor | .................... | B60Q 9/008 345/660 |
| 2011/0172855 A1* | 7/2011 | Marstall | ............... | G05D 1/0808 701/9 |
| 2016/0131908 A1* | 5/2016 | Fateh | ...................... | G06F 3/147 345/633 |

FOREIGN PATENT DOCUMENTS

| | | |
|---|---|---|
| CN | 100423964 | 1/2007 |
| CN | 104850376 A | 8/2015 |
| CN | 105093530 A | 11/2015 |

OTHER PUBLICATIONS

First Office Action for Chinese Patent Application No. 201610988827.7 dated Aug. 21, 2018. 10 pages.
Second Office Action for CN Patent Application No. 201610988827.7 dated Apr. 26, 2019. 9 pages.

* cited by examiner

*Primary Examiner* — Dennis P Joseph
(74) *Attorney, Agent, or Firm* — Donna P. Suchy; Daniel M. Barbieri

(57) ABSTRACT

A display system includes a display and a computer. The computer is configured to cause the display provide a visual cue in a far or mid peripheral vision area of the display with respect to a user's forward looking view through the display. The display system can be a head up display (HUD) on a worn display for use in aircraft or other applications.

20 Claims, 8 Drawing Sheets

WORN DISPLAY USING A PERIPHERAL VIEW

BACKGROUND

The inventive concepts disclosed herein relate generally to the field of head up displays (HUDs) including but not limited to HUDs used in aircraft.

A HUD may be used by an operator of an aircraft or other equipment to allow the operator to have a view of an environment with superimposed information, such as symbols and images captured by sensors. Worn HUDs, including but not limited to head worn displays (HWDs), such as, helmet mounted displays (HMDs), are used in aircraft applications (e.g., both in in-flight applications and simulator applications), surface-based transportation applications, medical applications, robotic applications, entertainment applications, and other applications. Head worn displays include monocular type displays having a single display area (viewable by one or two eyes) and binocular type displays having separate left and right eye display areas. With a binocular type display, the left eye sees a left eye image display while the right eye sees a right eye image display.

Worn display systems also generally include a tracking system for tracking the position of the head or eyes of the user. Head tracking can be achieved through various techniques, most often in the form of magnetic tracking, ultrasonic tracking, inertial tracking, optical tracking and hybrid optical-inertial tracking. Optical tracking can either be achieved through outside-in sensing (where a system of cameras is mounted external to the object being tracked with active/unique fiducials mounted on the object of interest), or inside-out sensing (where a camera is mounted on the object of interest and tracks active/unique fiducials of the external scene). Eye tracking can be achieved using sensors configured to sense pupil position.

The tracking system provides information to a HUD computer so the HUD computer can cause the displayed symbology to appear conformal to the environment (e.g., the real world), even though the reference frame of the projection system is the pilot's head. Such tracking systems are often complex, costly and add latency to the worn display system and require some recognizable and measurable reference from which to infer the position of the pilot's head or eyes.

SUMMARY

In one aspect, embodiments of the inventive concepts disclosed herein are directed to a display system. The display system includes a display and a computer. The computer is configured to cause the display provide a visual cue in a far or mid peripheral vision area of the display with respect to a user's forward looking view through the display.

In a further aspect, embodiments of the inventive concepts disclosed herein are directed to a method of providing a visual cue using a display system having a display. The method includes determining a condition associated with a position or movement of a vehicle, and providing the visual cue on the display. The visual cue is provided in a far or mid peripheral vision area of the display with respect to a user's forward looking view through the display.

In a further aspect, embodiments of the inventive concepts disclosed herein are directed to a display system. The worn display system includes a combiner, an image source, a projector, and a processor. The processor is configured to cause the image source to provide a visual cue for projection to a peripheral vision area of the display associated with a forward view through the combiner.

BRIEF DESCRIPTION OF THE DRAWINGS

Implementations of inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings refer to the same or similar element, feature, or function. In the drawings.

DETAILED DESCRIPTION

Referring generally to the drawings, systems for and methods of providing a cue on a HUD (e.g., a worn display) are described according to some exemplary embodiments. Cues associated with alerts, warnings, conditions, and/or sensed information are provided in the peripheral vision area of the worn display or fixed HUD in some embodiments. The methods and systems advantageously place the cues in the peripheral vision area of a combiner associated with a HUD without the use of conformal symbology and without requiring head or eye tracking. In some embodiments, the cues are provided with conformal symbology and head tracking or eye tracking is utilized on a worn display. In some embodiments, the systems and methods provide positional, analog, dynamic cues in the far or mid peripheral region on the combiner. The systems and methods provide a left or right rotate cue, a rising or falling cue, an alert up or down cue, an above, above right, above left, below, below left, or below right exclusion cue, or any combination thereof in some embodiments.

Figure 1:
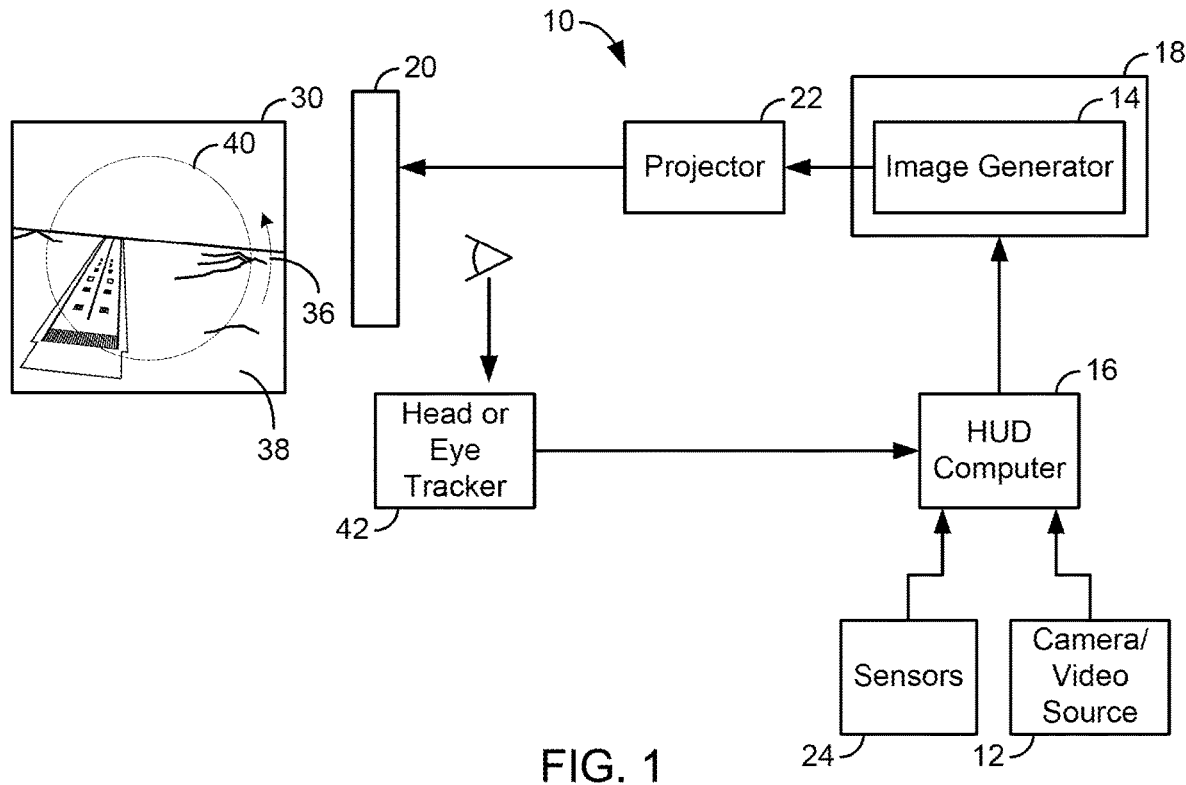
FIG. 1 is a general block diagram of a worn display system configured for display of information in the peripheral view according to an embodiment of the inventive concepts disclosed herein.

With reference to FIG. 1, an embodiment of a display system 10 includes video source 12, a HUD computer 16, a display processor 18, a combiner 20, a projector 22, and sensors 24. A user can wear the display system 10 and view a binocular or monocular display images provided on the combiner 20 by the projector 22 in some embodiments. In some embodiments, the user simultaneously views a real world scene and the displayed image 30 on the combiner 20. In some embodiments the display system 10 provides information without requiring head tracking components of conventional systems and employs a strategy for warnings that do not require head tracking.

In some embodiments, the display system 10 is a helmet mounted display (HMD), head worn display (HWD), a worn HUD, or other HUD. Although the display system 10 is described below with respect to an aircraft environment, the display system 10 can be used in other environments including land-based vehicle environments, medical environments, simulation environments, military environments, etc., without departing from the inventive concepts disclosed herein. In some embodiments, the display system 10 is worn, and in some embodiments, display system 10 is a fixed combiner HUD which is not worn by a user. The display system 10 is a binocular system, such as, a helmet mounted binocular system, in some embodiments.

In some embodiments, the HUD computer 16 processes information from the sensors 24 and causes a cue 36 associated with the processed information to be provided on a peripheral portion 38 of the view on the combiner 20. The peripheral portion 38 is outside a central portion 40 associated with a center view through the combiner 20. In some embodiments, the peripheral portion 38 is outside of a relatively narrow view associated with central focus through the combiner 20 by the pilot or operator.

In some embodiments, the peripheral portion 38 is associated with viewing angles of approximately 30° to 110° (e.g., 30° to 90°, 30° to 75°, 45° to 90°, 45° to 75°, 60° to 90°, 60° to 75°). In some embodiments, the display system 10 does not provide information or images in areas exclusive of the peripheral portion 38 (e.g., cues such as the cue 36 are shown on the peripheral portion 38 of the combiner 20). In some embodiments, the peripheral portion 38 is an annular or an oval shaped donut region.

In some embodiments, an image (e.g., a video image) is captured from the video source 12 and provided on the combiner 20 conformally with the real world scene 30. A head or an eye tracker 42 is used with components of the display system 10 to provide data for conformal operation in some embodiments. In some embodiments, conformal symbols and images are not provided on the combiner 20 and the head tracker 42 is not included or used with the display system 10.

The sensors 24 include one or more of a flight management computer, an inertial reference system, an altimeter, a global positioning system (GPS) receiver, a pitch sensor, a roll sensor, an elevation sensor, a tilt sensor, a yaw sensor, an airspeed sensor, an integrated landing system, a terrain avoidance warning system (TAWS), a weather radar system, a flight management system, and a traffic collision avoidance system (TCAS), in some embodiments. The sensors 24 provide data related to aircraft position (longitude, latitude, altitude, pitch, yaw, rotation, etc.) and movement (airspeed, heading, vertical airspeed, acceleration, etc.). The HUD computer 16 processes the data to provide cues such as the cue 36 regarding aircraft position, movement and/or corrective actions to the pilot. The data from the sensors 24 includes phase of flight data in some embodiments. Certain types of cues can be enabled or disabled based upon phase of flight in some embodiments. In some embodiments, the placement of the cue 36 with respect to a central view is based upon the phase of flight data. For example, the cue 36 is provided at portions of the combiner 20 associated with smaller viewing angles when in a landing or take off phase of flight.

The cue 36 can provide positional or movement based warnings, alerts, conditions or information. The cue 36 is one or more of a left or right rotate cue, a rising or falling cue, an alert up or down cue, an above, above right, above left, below, below left, or below right exclusion cue, or any combination thereof in some embodiments. The cue 36 is animated or dynamic in some embodiments. The cue 36 is color coded in some embodiments. The color, size, and degree of animation of the cue 36 can indicate a level of threat in some embodiments.

The display processor 18 includes an image generator 14 that receives data including symbology and/or cues for the peripheral portion 38. The data can be provided as a video frame, video stream or graphic data for provision of the symbology and/or cues in some embodiments. Commands or instructions for the cues are provided from the HUD computer 16 to the display processor 18 in some embodiments. The image generator 14 responds to the commands, instructions or video data from the HUD computer 16 and configures the data for display on the combiner 20 using the projector 22. The image generator 14 is a combination of hardware and software that processes graphic or video data in some embodiments.

The display processor 18 is a field programmable gate array, digital signal processor, a graphical processor, or combinations thereof. The display processor 18 is part of the HUD computer 16 in some embodiments. The HUD computer 16 is a computing platform for performing the operations described herein and can be configured by software modules or other routines. The image generator 14 and the HUD computer 16 can be software routines or software modules operating on a computer platform associated with the display processor 18 in some embodiments.

The combiner 20 is any type of optical device for providing images from the image generator 14 to the user. In some embodiments, the combiner 20 is a prismatic combiner, a waveguide combiner, a holographic combiner, a reflective combiner, a screen, or other optical medium. In some embodiments, the combiner 20 is a visor combiner associated with a HMD. The combiner 20 can be manufactured from a glass or a composite material in some embodiments.

The projector 22 is any optical device for projecting an image to the combiner 20. The projector 22 provides images associated with data or electric signals from the image generator 14. The projector 22 can include waveguides, fiber optics, prisms, an image source, etc. for projecting the image to the combiner 20. The projector 22 can be a monochrome or color projector.

The video source 12 is a camera or other sensor (e.g., infrared, visible light, radar, etc.). The video source 12 provides a video signal or video data to the processor 18 or the HUD computer 16 in some embodiments. In some embodiments, the display system 10 includes more than one video source 12. In some embodiments, the video source 12 may be omitted and data from the video source 12 is not used.

The head tracker 42 is an eye position sensing device and/or head position sensing device and is optional. The head tracker 42 is a magnetic sensing system, ultrasonic tracking system, inertial tracking system, optical tracking system and hybrid optical-inertial tracking, or combinations thereof. In some embodiments, the head tracker 42 tracks eye position and is a pupil sensor. Head tracker 42 provides head tracking and/or eye tracking data in some embodiments. In some embodiments, the head tracker 42 is an optional component and data from head tracker 42 is not utilized.

Figure 2:
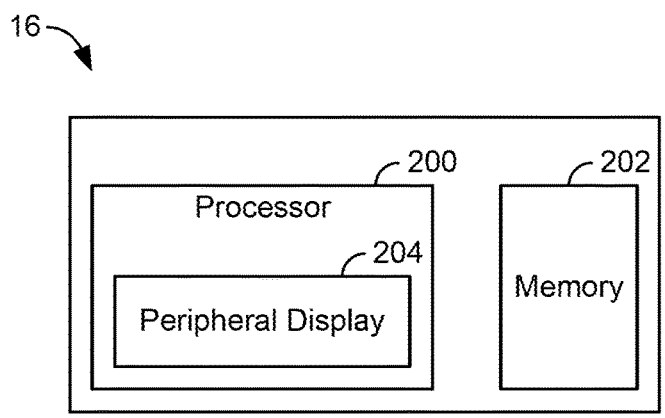
FIG. 2 is a more detailed block diagram of a HUD computer for the display system of FIG. 1 according to an embodiment of the inventive concepts disclosed herein.

With reference to FIG. 2, the HUD computer 16 includes a processor 200 and a memory 202. The HUD computer 16 is any computer platform for providing HUD functionality including the providing of cues, such as the cue 36 (FIG. 1) in the peripheral portion 38 of the combiner 20 in some embodiments. The HUD computer 16 is in communication with the image generator 14. The processor 200 includes a peripheral display generator 204. Peripheral display generator 204 can be a circuit, module, routine or any combination thereof that causes the cue 36 to be provided in the peripheral portion 38 of the combiner 20 (FIG. 1) in some embodiments. The peripheral display generator 204 receives data and provides data indicative of symbology or cues for display in the peripheral portion 38 in some embodiments. The data is provided as a video frame, video stream or instructions for provision of the cue 36 in some embodiments. The cue 36 provided by the peripheral display generator 204 is a visual cue indicating positional or movement information based upon data form the sensors 24 in some embodiments. The magnitude of the cue 36 can be provided using animation, color and/or size of the cue. The image generator 14 configures the data including the data related to the cue 36 for display on the combiner 20 using the projector 22.

The processor 200 is a field programmable gate array, digital signal processor, a graphical processor, or combinations thereof. The processor 200 can be part of the processor 18 in some embodiments. The peripheral display generator 204 is one or more software routines executed on the HUD computer 16 in some embodiments. The memory 202 is any type of storage device (e.g., electronic memory, hard drive, and flash drive)

Figure 3:
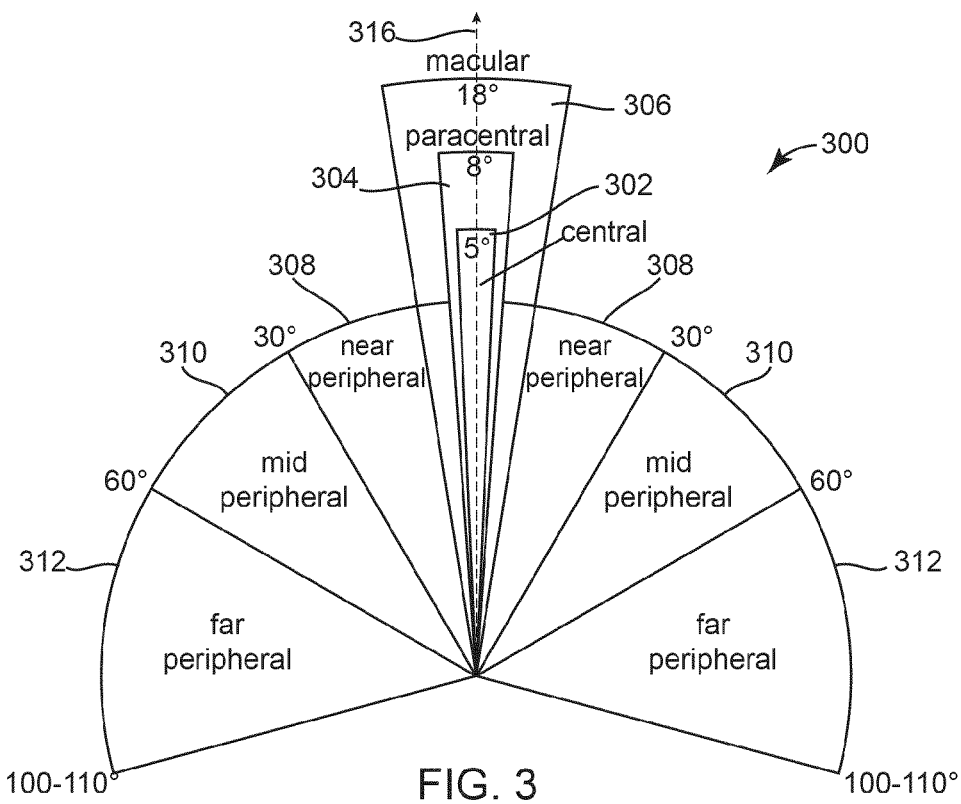
FIG. 3 is a schematic top view drawing illustrating of vision regions for the display system illustrated in FIG. 1 according to an embodiment of the inventive concepts disclosed herein.

With reference to FIG. 3, a view 300 through the combiner 20 (FIG. 1) includes a central view 302, a paracentral view 304, a macular view 306, a near peripheral view 308, a mid-peripheral view 310, and a far peripheral view 312 assuming a central axis 316 through the combiner 20 corresponds to a view straight through the combiner 20. The central view 302 includes viewing angles between 2.5° and −2.5° from the central axis 316 in some embodiments. The paracentral view 304 includes viewing angles between 4° and −4° from the central axis 316 in some embodiments. The macular view 306 includes viewing angles between 9° and −9° from the central axis in some embodiments. The near peripheral view 308 includes viewing angles between 9° and 30° and −9° and −30° from the central axis 316 in some embodiments. The mid peripheral view 310 includes viewing angles between 30° and 60° and −30° and −60° degrees from the central axis 316 in some embodiments. The far peripheral view 312 includes viewing angles between 60° and 110° and −60° and −110° from the central axis 316 in some embodiments. The far peripheral view 312 includes viewing angles between 60° and 100° and −60° and −100° from the central axis 316 in some embodiments.

Figure 4:
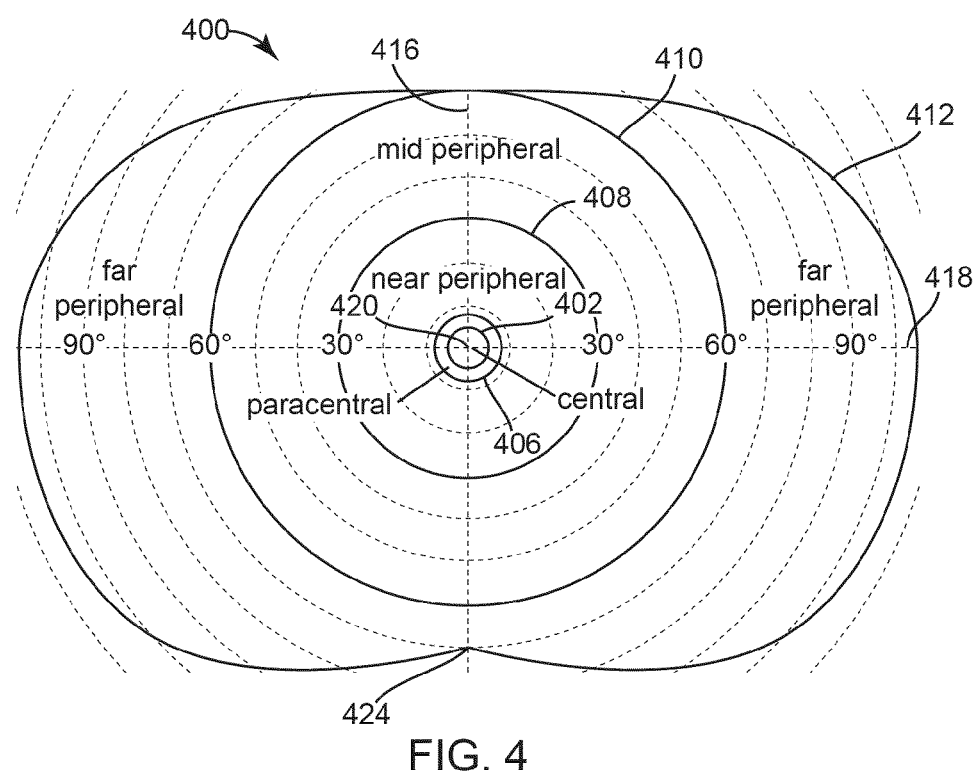
FIG. 4 is a schematic front view drawing illustrating vision regions for the display system illustrated in FIG. 1 according to an embodiment of the inventive concepts disclosed herein.

With reference to FIG. 4, a view 400 through the combiner 20 (FIG. 1) includes a circular central view 402, a circular paracentral view 406, a circular near peripheral view 408, a circular mid peripheral view 410, and a non-circular far peripheral view 412 with respect to a view directly through an intersection 420 of a vertical plane 416 and a horizontal plane 418. The circular central view 402 includes viewing angles between 0° and 2.5° from the intersection 420 in some embodiments. The circular paracentral view 406 includes viewing angles between 2.5° and 4° from the intersection 420 in some embodiments. The circular near peripheral view 408 includes viewing angles between 9° and 30° from the intersection 420 in some embodiments. The circular mid peripheral view 410 includes viewing angles between 30° and 60° from the intersection 420 in some embodiments. The shape of view 400 is exemplary.

The non-circular far peripheral view 412 includes viewing angles between 60° and 110° from the intersection 420 in some embodiments. The non-circular far peripheral view 412 includes viewing angles between 60° and 100° from the intersection 420 in some embodiments. The non-circular peripheral view has a somewhat oval shape with an indented portion 424 along the vertical plane 416 in some embodiments. In some embodiments, the far peripheral view 412 has a range of viewing angles from 60° to 90° along a top border 426, a range of viewing angles from 70° to 90° along a bottom border 428, a range of viewing angles from 90° to 105° along a side border 432, and a range of viewing angles from 90° to 105° along a side border 434. The shapes of circular central view 402, a circular paracentral view 406, a circular near peripheral view 408, a circular mid peripheral view 410, and a non-circular far peripheral view 412 are shown in an exemplary fashion.

Figure 5:
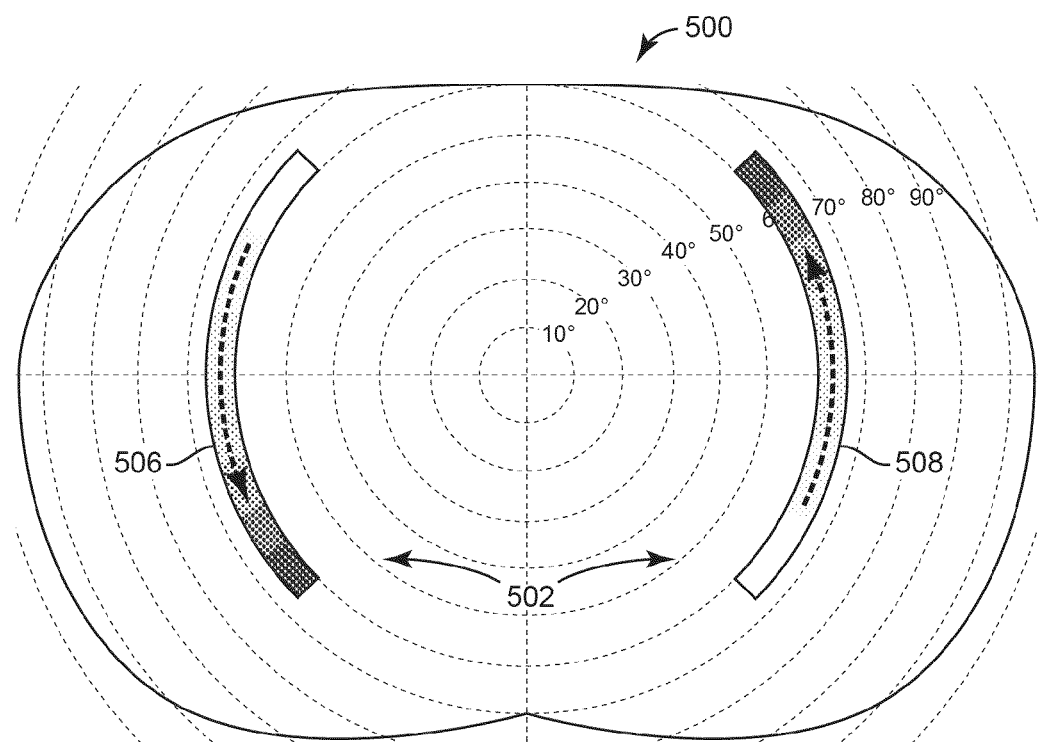
FIG. 5 is a schematic front view drawing illustrating a rotate left cue for the display system illustrated in FIG. 1 according to an embodiment of the inventive concepts disclosed herein.

With reference to FIG. 5, a view 500 through the combiner 20 (FIG. 1) includes a cue 502 provided in the non-circular far peripheral view 412 (FIG. 4). In some embodiments, the cue 502 is provided in the mid peripheral view 410, the near peripheral view 408 or in combinations of the non-circular far peripheral view 412, the mid peripheral view 410 and/or the near peripheral view 408. The cue 502 is a dynamic, visual cue including a symbol 506 and a symbol 508 in some embodiments, The symbols 506 and 508 are each provided along an arc associated with a viewing angle range (e.g., between 60° and 70°) in some embodiments. In some embodiments, the cue 502 is provided horizontally and/or vertically transgressing viewing angle ranges.

The symbol 506 includes an arrow pointing down and the symbol 508 includes an arrow pointing up in some embodiments. In some embodiments, symbols 506 and 508 do not include arrows (e.g., are arc-shaped bars). The symbols 506 and 508 are curved rays that have a length in the viewing angle range that corresponds to the magnitude of the condition or instruction for correction in some embodiments. The symbols 506 and 508 are color coded (e.g., green, yellow, orange, red) corresponding to the magnitude of the condition or instruction for correction in some embodiments. In some embodiments, the symbols 506 and 508 include bars of color wherein the total number of bars and/or color represent magnitude. In some embodiments, the symbols 506 and 508 flash or strobe to indicate a level of the condition (e.g., a higher flash rate corresponding to a higher threat level or condition level) or urgency. Various symbology (triangles, chevrons, dashed lines, etc.) can be used to provide the cue 502.

In some embodiments, the symbols 506 and 508 of the cue 502 are dynamic and grow to a magnitude associated with the magnitude of the condition of the warning and return to a smaller size. The symbols 506 and 508 dynamically grow at a frequency of between 0.1 to 10 hertz in some embodiments. In some embodiments, the frequency increases as the magnitude of the condition or warning increases. In some embodiments, the symbols 506 and 508 are each animated at the same time. In some embodiments, the symbols 506 and 508 are animated serially.

The cue 502 provides an indication of a rotate left condition. In some embodiments, the rotate left condition is provided by a flight management system with respect to a selected heading or an approach to the HUD computer 16 (FIG. 2). The cue 502 is an indication that the pilot should rotate the aircraft left (e.g., counter clockwise) in some embodiments. In some embodiments, the cue 502 is an indication that the aircraft is in a left rotated condition and that the pilot should rotate the aircraft right (e.g., clockwise). The appropriate action to take in response to the cue 502 can be chosen in accordance with ergonomic principles and physiological reactions.

Figure 6:
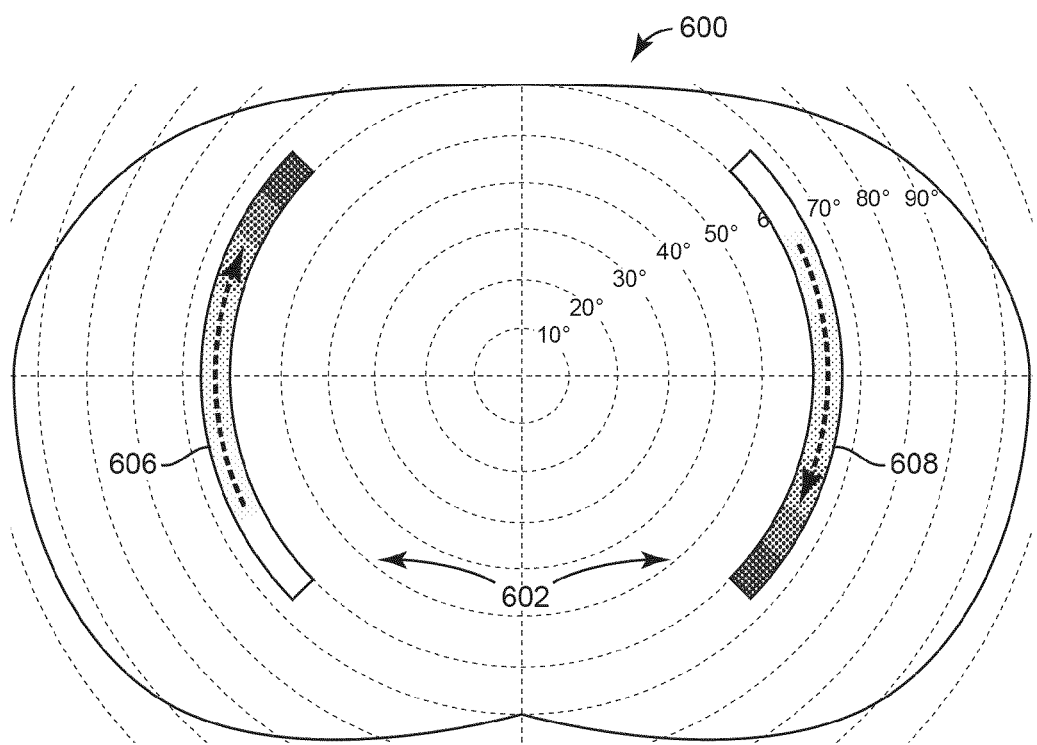
FIG. 6 is a schematic front view drawing illustrating a rotate right cue for the display system illustrated in FIG. 1 according to an embodiment of the inventive concepts disclosed herein.

With reference to FIG. 6, a view 600 through the combiner 20 (FIG. 1) includes a cue 602 provided in the non-circular far peripheral view 412 (FIG. 4). In some embodiments, the cue 602 is provided in the mid peripheral view 410, the near peripheral view 408 or in combinations of the non-circular far peripheral view 412, the mid peripheral view 410 and/or the near peripheral view 408. The cue 602 is a dynamic, visual cue including a symbol 606 and a symbol 608 in some embodiments. In some embodiments, the cue 602 is similar to the cue 502 (FIG. 5) except that the symbol 606 is upside down with respect to the symbol 506 and the symbol 608 is upside down with respect to the symbol 508 in some embodiments.

The cue 602 provides an indication of a rotate right condition in some embodiments. In some embodiments, the rotate right condition is provided by a flight management system with respect to a selected heading or an approach. The cue 602 is an indication that the pilot should rotate the aircraft left (e.g., clockwise). In some embodiments, the rotate right condition is an indication that the aircraft is in a right rotated condition and that the pilot should rotate the aircraft left (e.g., counter clockwise). The appropriate action to take in response to the cue 602 can be chosen in accordance with ergonomic principles and physiological reactions.

Figure 7:
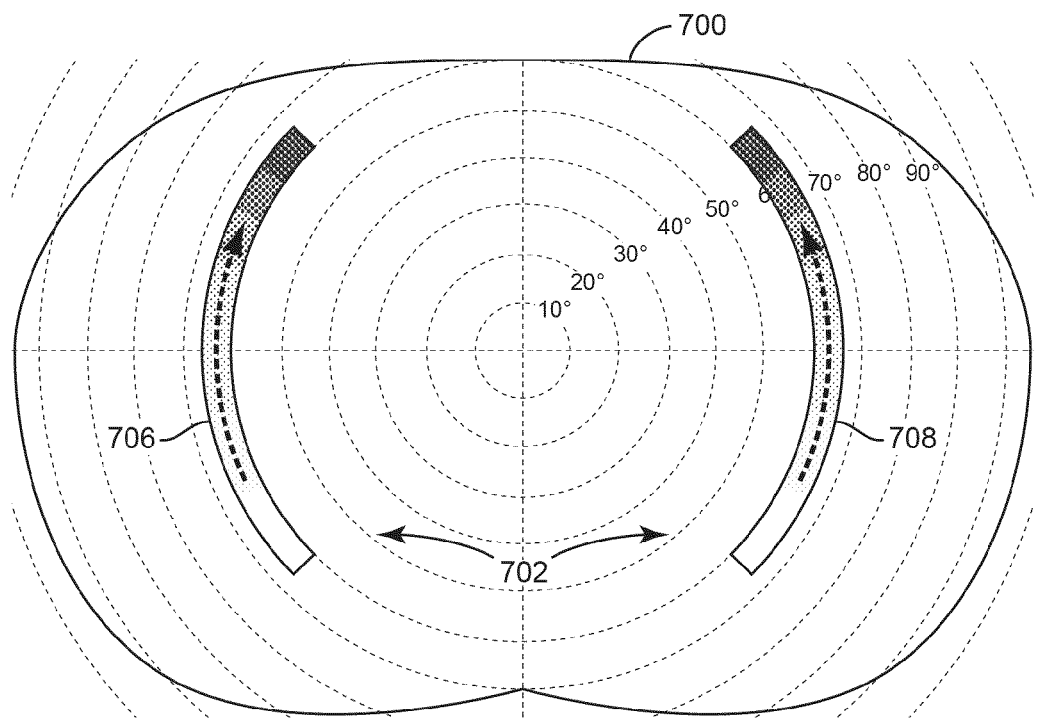
FIG. 7 is a schematic front view drawing illustrating a rising cue for the display system illustrated in FIG. 1 according to an embodiment of the inventive concepts disclosed herein.

With reference to FIG. 7, a view 700 through the combiner 20 (FIG. 1) includes a cue 702 provided in the non-circular far peripheral view 412 (FIG. 4). In some embodiments, the cue 702 is provided in the mid peripheral view, the near peripheral view 408 or in combinations of the non-circular far peripheral view 412, the mid peripheral view 410 and/or the near peripheral view 408. The cue 702 is a dynamic, visual cue including a symbol 706 and a symbol 708 in some embodiments. In some embodiments, the cue 702 is similar to the cue 502 (FIG. 5) except that the symbol 706 is upside down with respect to the symbol 506. The symbol 608 has the same orientation with respect to the symbol 508 in some embodiments.

The cue 702 provides an indication of a rising condition. A rising condition is a situation where the aircraft is below a glide scope in some embodiments. In some embodiments, the cue 702 gives the pilot a sensation of falling in the peripheral vision. The rising condition is determined from integrated landing system (ILS) data or glide scope data provided by the sensors 24 in some embodiments. In some embodiments, the cue 702 is an indication that the pilot should raise the aircraft (e.g., increase altitude). In some embodiments, the cue 702 is an indication that the aircraft is too high and that the pilot should decrease altitude. The appropriate action to take in response to the cue 702 can be chosen in accordance with ergonomic principles and physiological reactions.

Figure 8:
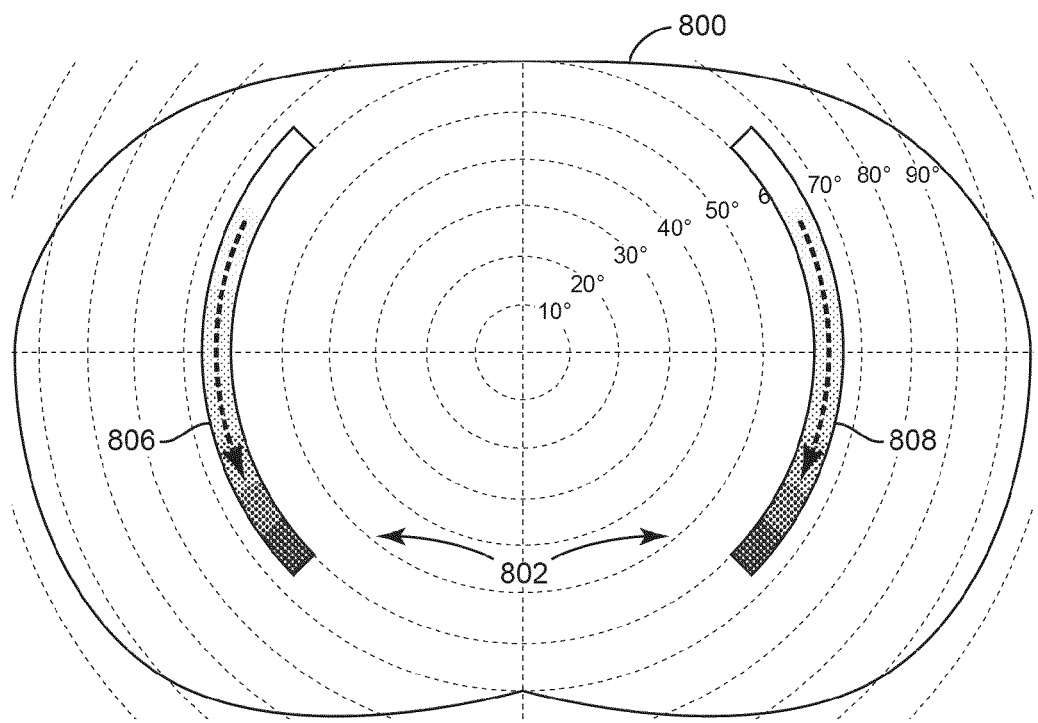
FIG. 8 is a schematic front view drawing illustrating a falling cue for the display system illustrated in FIG. 1 according to an embodiment of the inventive concepts disclosed herein.

With reference to FIG. 8, a view 800 through the combiner 20 (FIG. 1) includes a cue 802 provided in the non-circular far peripheral view 412 (FIG. 4). In some embodiments, the cue 802 is provided in the mid peripheral view, the near peripheral view 408 or in combinations of the non-circular far peripheral view 412, the mid peripheral view 410 and/or the near peripheral view 408. The cue 802 is a dynamic, visual cue including a symbol 806 and a symbol 808 in some embodiments. In some embodiments, the cue 802 is similar to the cue 502 (FIG. 5) except that the symbol 808 is upside down with respect to the symbol 508. The symbol 806 has the same orientation with respect to the symbol 506 in some embodiments.

The symbols 806 and 808 are similar to symbols 706 and 708 (FIG. 7) except the orientation of the symbols is opposite to indicate a falling condition. The falling condition is a situation where the aircraft is above a glide scope in some embodiments. In some embodiments, the cue 802 gives the pilot a sensation of rising in the peripheral vision. The falling condition is determined from integrated landing system (ILS) data or glide scope data provided by the sensors 24. In some embodiments, the falling condition is an indication that the pilot should lower the aircraft (e.g., decrease altitude). In some embodiments, the falling condition is an indication that the aircraft is too low and that the pilot should increase altitude. The appropriate action to take in response to the cue 802 can be chosen in accordance with ergonomic principles and physiological reactions.

Figure 9:
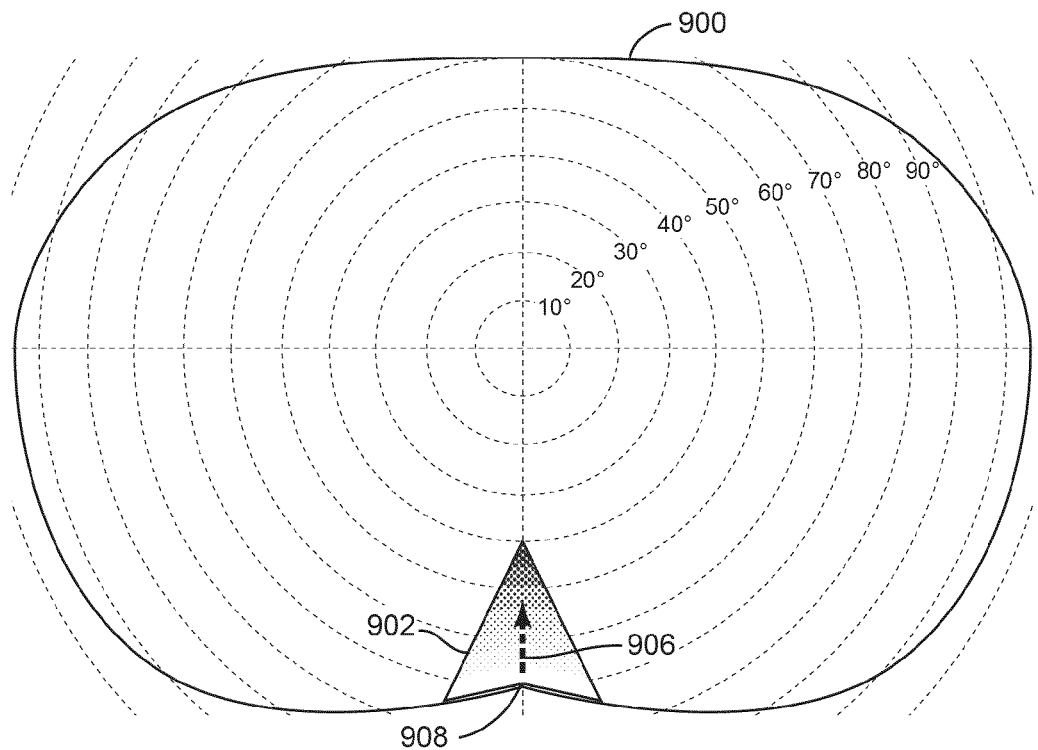
FIG. 9 is a schematic front view drawing illustrating an alert up cue for the display system illustrated in FIG. 1 according to an embodiment of the inventive concepts disclosed herein.

With reference to FIG. 9, a view 900 through the combiner 20 (FIG. 1) includes a cue 902 provided in the non-circular far peripheral view 412 (FIG. 4). In some embodiments, the cue 902 is provided in the mid peripheral view 410, the near peripheral view 408 or in combinations of the non-circular far peripheral view 412, the mid peripheral view 410 and/or the near peripheral view 408. The cue 902 is a dynamic, visual cue including a symbol 906 in some embodiments. The symbol 906 is provided at an indent 908 along a bottom of the view 900 in a viewing angle range between −75° and −40° in some embodiments.

The symbol 906 includes an arrow pointing up and is chevron-shaped with a bottom of the chevron along the bottom edge of the view 900. The symbol 906 has a height and width that corresponds to the magnitude of the condition or instruction for correction in some embodiments. The symbol 906 can be color coded (e.g., green, yellow, orange, red) corresponding to the magnitude of the condition or instruction for correction in some embodiments. In some embodiments, the symbol 906 includes bars of color wherein the total number of bars and/or color represent magnitude. In some embodiments, the symbol 906 can flash to indicate a level of the condition (e.g., a higher flash rate corresponding to a higher threat level or condition level). Various symbology (triangles, bars, dashed lines, etc.) can be used to provide the cue 902. In some embodiments, the cue 902 does not include the arrow.

In some embodiments, the symbol 906 is dynamic and grows to a magnitude associated with the magnitude of the condition of the warning and return to a smaller size. When the symbol 906 becomes larger, a larger viewing angle range is covered by the symbol 906. The symbol 906 dynamically grows at a frequency of between 0.1 to 10 hertz in some embodiments. In some embodiments, the frequency increases as the magnitude of the condition or warning increases.

The cue 902 provides an indication of an alert up condition. In some embodiments, the alert up condition is an indication that the pilot should raise the aircraft (e.g., increase altitude). In some embodiments, the rising condition is an indication that the aircraft is too high and that the pilot should decrease altitude. The appropriate action to take in response to the cue 902 can be chosen in accordance with ergonomic principles.

Figure 10:
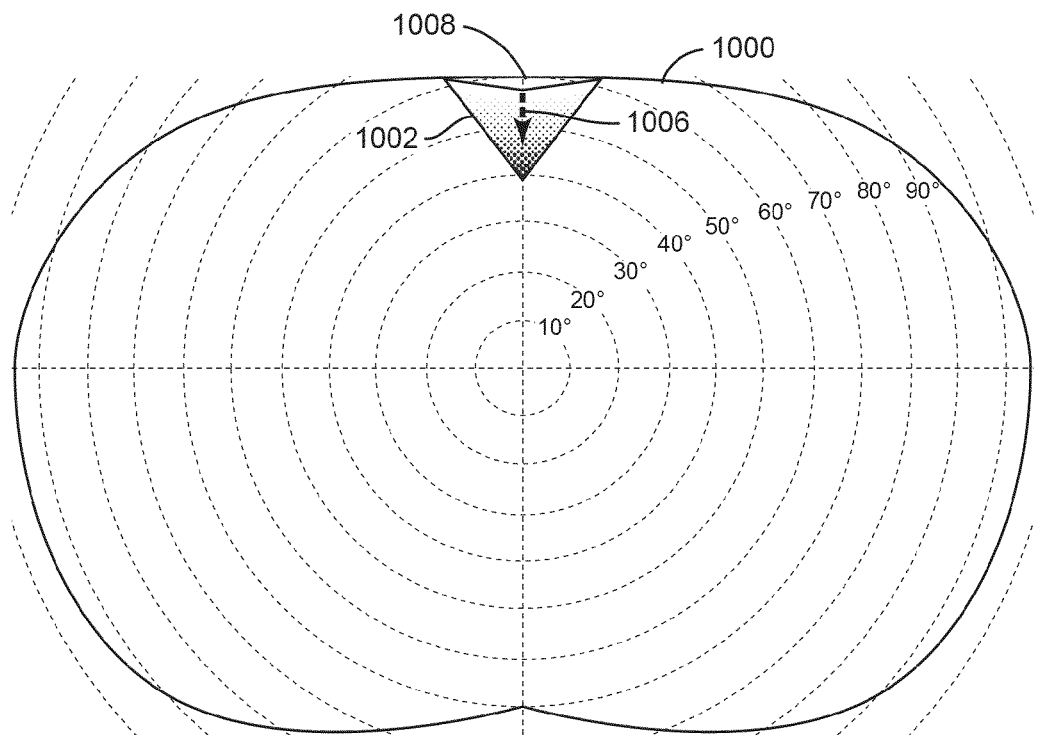
FIG. 10 is a schematic front view drawing illustrating an alert down cue for the display system illustrated in FIG. 1 according to an embodiment of the inventive concepts disclosed herein.

With reference to FIG. 10, a view 1000 through the combiner 20 (FIG. 1) includes a cue 1002 provided in the non-circular far peripheral view 412 (FIG. 4). In some embodiments, the cue 1002 is provided in the mid peripheral view 410, the near peripheral view 408 or in combinations of the non-circular far peripheral view 412, the mid peripheral view 410 and/or the near peripheral view 408. The cue 1002 is a dynamic, visual cue including a symbol 1006. The symbol 1006 is provided at a center point 1008 at atop of the view 900 in a viewing angle range between 40° and 60° in some embodiments.

The symbol 1006 is similar to symbol 906 (FIG. 9) except the orientation of the symbol 1006 is opposite the orientation of the symbol 906 to indicate an alert down condition. In some embodiments, the alert down condition is an indication that the pilot should raise the aircraft (e.g., increase altitude). In some embodiments, the alert down condition is an indication that the aircraft is too high and that the pilot should decrease altitude. The appropriate action to take in response to the cue 1006 can be chosen in accordance with ergonomic principles.

Figure 11:
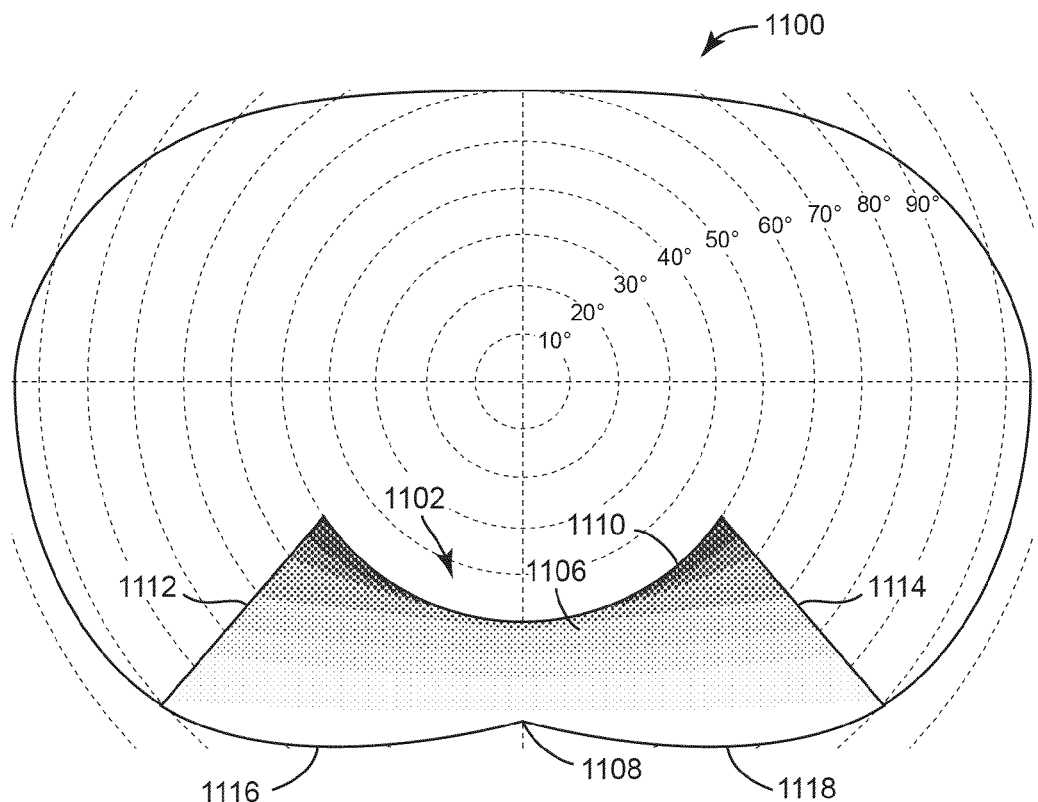
FIG. 11 is a schematic front view drawing illustrating a below exclusion cue for the display system illustrated in FIG. 1 according to an embodiment of the inventive concepts disclosed herein.

With reference to FIG. 11, a view 1100 through the combiner 20 (FIG. 1) includes a cue 1102 provided in the non-circular far peripheral view 412 (FIG. 4). In some embodiments, the cue 1102 is provided in the mid peripheral view 410, the near peripheral view 408 or in combinations of the non-circular far peripheral view 412, the mid peripheral view 410 and/or the near peripheral view 408. The cue 1102 is a dynamic, visual cue having a bat winged shaped symbol 1106 including a concave border 1110, a slanted border 1112, a slanted border 1114, a convex border 1116, and a convex border 1118 in some embodiments. The symbol 1106 is provided with an indent 1108 corresponding to a point between the convex borders 1116 and 1118 along a bottom of the view 900 in a viewing angle range between 75 and 50 degrees in some embodiments. The concave border 1110 corresponds to a viewing angle border (e.g., 50°) in some embodiments.

The symbol 1106 has a height and width that corresponds to the magnitude of the condition or instruction for correction in some embodiments. The symbol 1106 can be color coded (e.g., green, yellow, orange, red) corresponding to the magnitude of the condition or instruction for correction in some embodiments. In some embodiments, the symbol 1106 includes bars of color wherein the total number of bars and/or color represent magnitude. In some embodiments, the symbol 1106 flashes or strobes to indicate a level of the condition (e.g., a higher flash rate corresponding to a higher threat level or condition level). Various symbology (triangles, bars, dashed lines, etc.) can be used to provide the cue 1102.

In some embodiments, the symbol 1106 is dynamic and grows to a magnitude associated with the magnitude of the condition of the warning and return to a smaller size. When the symbol 1106 becomes larger, a larger viewing angle range is covered by the symbol 1106. The symbol 1106 dynamically grows at a frequency of between 0.1 to 10 hertz in some embodiments. In some embodiments, the frequency increases as the magnitude of the condition or warning increases.

The cue 1102 provides an indication of a below exclusion condition. In some embodiments, the below exclusion condition is an indication that the pilot should raise the aircraft (e.g., increase altitude). In some embodiments, the cue 1102 is an indication that terrain or another obstacle is near the aircraft at a location associated with the placement of the symbol 1106. The cue 1102 is generated in response to data from a terrain avoidance warning system in some embodiments. The appropriate action to take in response to the cue 1102 can be chosen in accordance with ergonomic principles.

Figure 12:
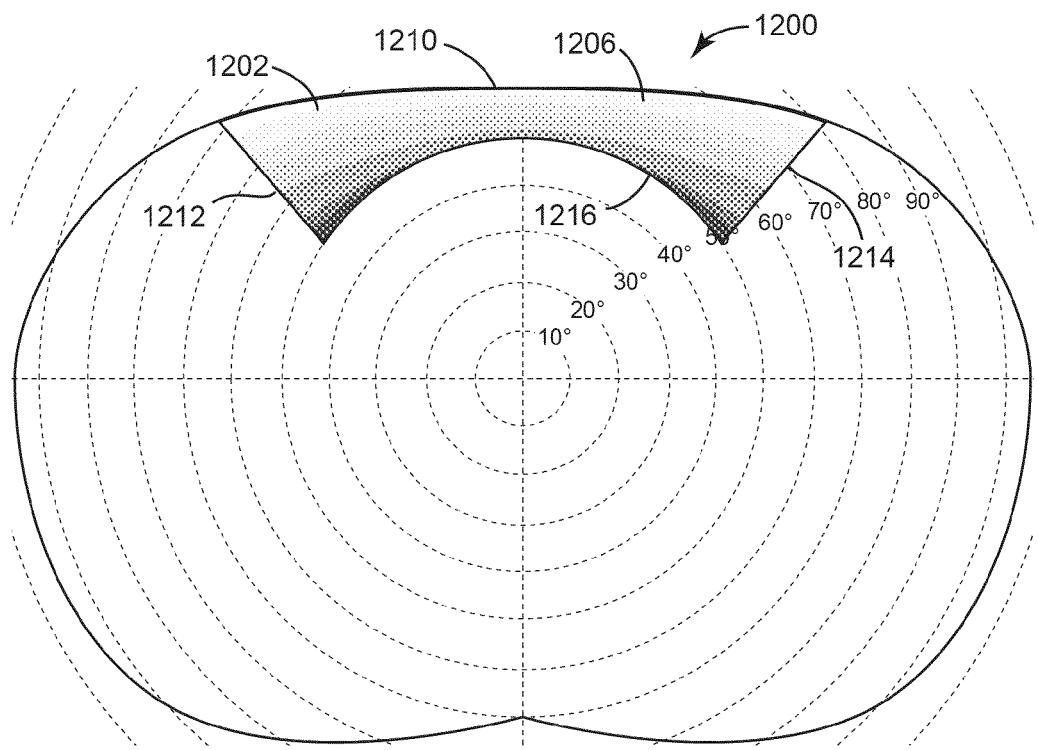
FIG. 12 is a schematic front view drawing illustrating an above exclusion cue for the display system illustrated in FIG. 1 according to an embodiment of the inventive concepts disclosed herein.

With reference to FIG. 12, a view 1200 through the combiner 20 (FIG. 1) includes a cue 1202 provided in the non-circular far peripheral view 412 (FIG. 4). In some embodiments, the cue 1202 is provided in the mid peripheral view 410, the near peripheral view 408 or in combinations of the non-circular far peripheral view 412, the mid peripheral view 410 and/or the near peripheral view 408. The cue 1202 is a dynamic, visual cue including a symbol 1206 having a shape defined by a convex border 1210, a slanted border 1212, a slanted border 1214, and a concave border 1216 in some embodiments. The symbol 1206 is provided with the border 1210 along a top of the view 900 in a viewing angle range between 60° and 110° in some embodiments. The concave border 1216 corresponds to a viewing angle border (e.g., 50°) in some embodiments.

The symbol 1206 is similar to the symbol 1106 (FIG. 11) except the orientation of the symbols is opposite to indicate an above exclusion condition. In some embodiments, the above exclusion condition is an indication that the pilot should lower the aircraft (e.g., decrease altitude). In some embodiments, the cue 1206 is an indication that an obstacle (e.g., air traffic or weather) is near the aircraft at a location associated with the placement of the symbol 1206. In some embodiments, the cue 1202 is provided in response to data from a weather radar system or a traffic collision avoidance system. In some embodiments, the cue 1202 is an indication that the aircraft is too low and that the pilot should increase altitude. The appropriate action to take in response to the cue 1206 can be chosen in accordance with ergonomic principles.

Figure 13:
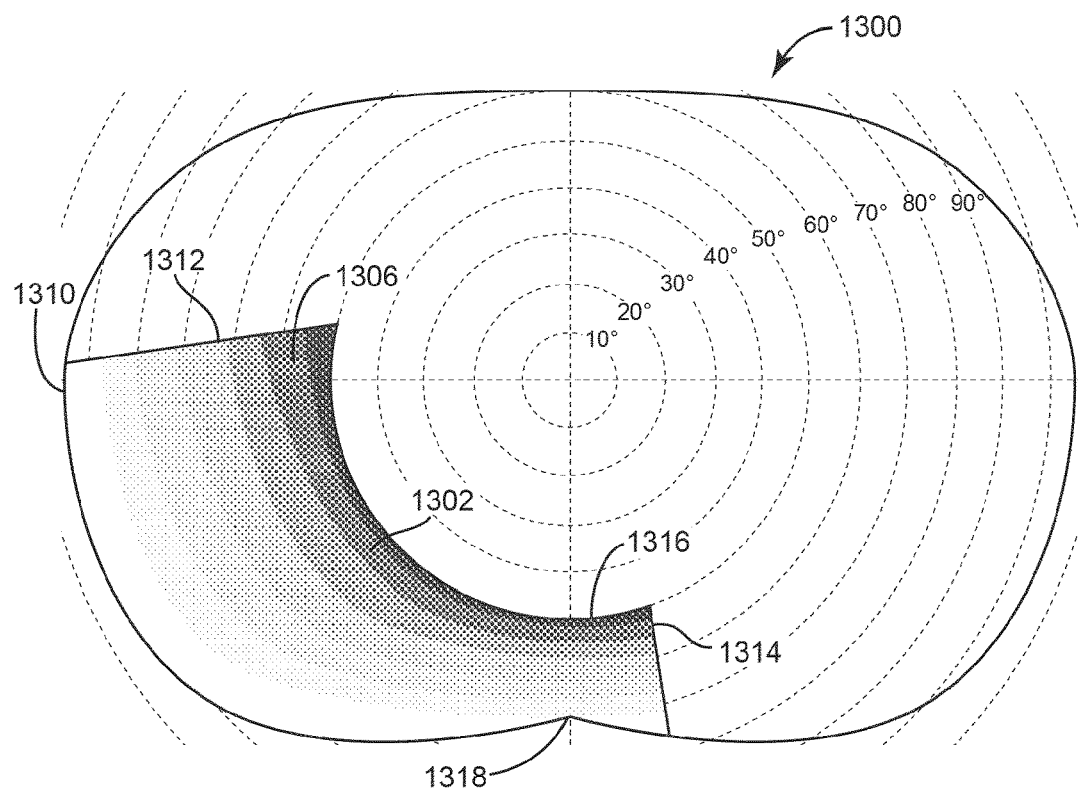
FIG. 13 is a schematic front view drawing illustrating a below left exclusion cue for the display system illustrated in FIG. 1 according to an embodiment of the inventive concepts disclosed herein.

With reference to FIG. 13, a view 1300 through the combiner 20 (FIG. 1) includes a cue 1302 provided in the non-circular far peripheral view 412 (FIG. 4). In some embodiments, the cue 1302 is provided in the mid peripheral view 410, the near peripheral view 408 or in combinations of the non-circular far peripheral view 412, the mid peripheral view 410 and/or the near peripheral view 408. The cue 1302 is a dynamic, visual cue including a symbol 1306 having a shape defined by a convex border 1310, a slanted border 1312, a slanted border 1314, and a concave border 1316 in some embodiments. The symbol 1306 is provided with the border 1310 along a bottom left portion of the view 900 in a viewing angle range between 60° and 110° in some embodiments. The symbol 1306 extends to the right of an indent 1318 at the slanted border 1314. The concave border 1216 corresponds to a viewing angle border (e.g., 50°) in some embodiments.

The symbol 1306 is similar to the symbol 1106 (FIG. 11) and 1206 (FIG. 12) except the orientation of the symbols positioned in the lower left quadrant of the view 1300 to indicate a below left exclusion in some embodiments. The symbol 1306 can be provided in the upper left quadrant of the view 1300 to indicate an above left exclusion condition in some embodiments. The symbol 1306 can be provided in the upper right quadrant of the view 1300 to indicate an above right exclusion condition in some embodiments. The symbol 1306 can be provided in the lower right quadrant of the view 1300 to indicate a below right exclusion condition in some embodiments. In some embodiments, the lower left exclusion condition is an indication that the pilot should raise and adjust the aircraft position to the right. In some embodiments, the cue 1202 is an indication that the aircraft is too high and too far to the right and that the pilot should increase altitude and move the aircraft to the left. The appropriate action to take in response to the cue 1302 can be chosen in accordance with ergonomic principles.

Figure 14:
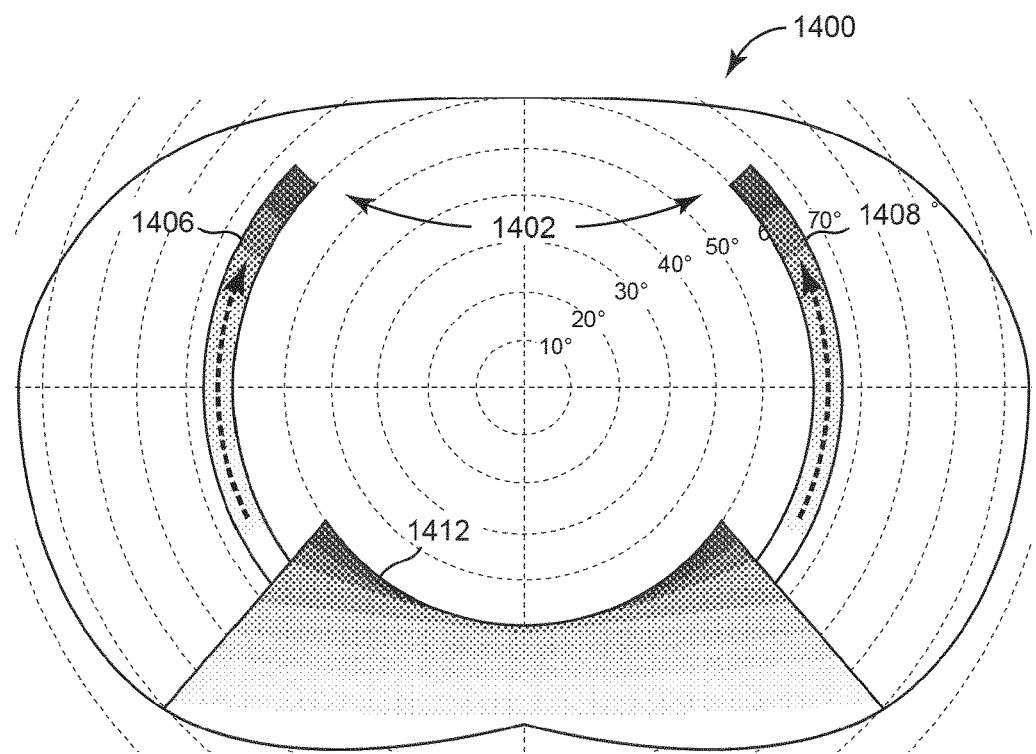
FIG. 14 is a schematic front view drawing illustrating a combined cue for the display system illustrated in FIG. 1 according to an embodiment of the inventive concepts disclosed herein.

With reference to FIG. 14, a view 1400 through the combiner 20 (FIG. 1) includes an alert up cue 1402 similar to the cue 502 (FIG. 5) and a below exclusion cue 1412 similar to the cue 1102 (FIG. 11). In some embodiments, other combinations of the cues 502, 602, 702, 802, 902, 1002, 1102, 1202, and 1302 are utilized depending upon the combination of conditions, warnings or alerts that are sensed.

Figure 15:
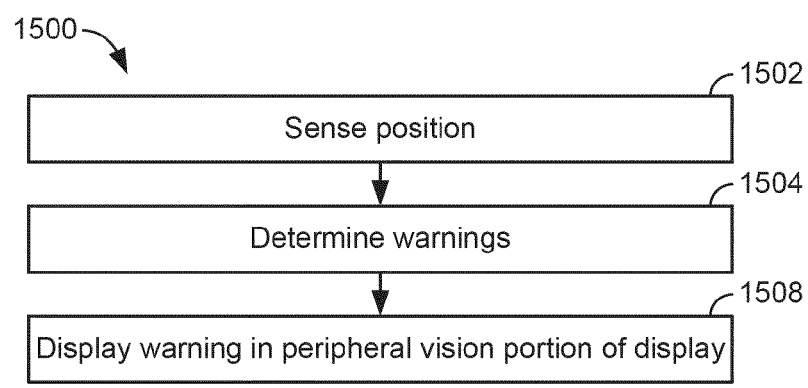
FIG. 15 is a flow diagram showing a cue displaying operation for the display system illustrated in FIG. 1 according to an embodiment of the inventive concepts disclosed herein.

With reference to FIG. 15, the display system 10 can use a flow 1500 to provide one or more of the cues 502, 602, 702, 802, 902, 1002, 1102, 1202, 1302 and 1402 on the combiner 20 (FIG. 1). The flow 1500 is performed by the HUD computer 16 in some embodiments.

At an operation 1502, the position of the vehicle, such as an aircraft, is sensed using the sensors 24 (FIG. 1). In some embodiments, positional or movement warnings or alerts are directly provided by a weather radar system, a terrain avoidance warning system, or a traffic collision avoidance system. At an operation 1504, the HUD computer 16 determines conditions, alerts, or warnings for display as one or more of the cues 502, 602, 702, 802, 902, 1002, 1102, 1202, and 1302 on the combiner 20. The warning conditions, alerts, or warnings are determined by comparing the position or movement to an expected flight path, approach, glide scope, or other routes in some embodiments. In some embodiments, the warning conditions or alerts are determined by comparing aircraft position and movement to terrain or an obstacle. At an operation 1508, the image generator 14 causes the combiner 20 to display the appropriate one or more of the cues 502, 602, 702, 802, 902, 1002, 1102, 1202, and 1302 in a peripheral vision region (e.g., the peripheral portion 38 (FIG. 1)). The image generator 14 responds to commands or data from the HUD computer 16 to generate an image for projection by projector 22 in some embodiments.

In some embodiments, the flow 1500 is performed after calibration routine used to determine the appropriate peripheral viewing area for the symbols on the combiner 20. In some embodiments, the pilot can look forward and cues can be provided at varying location until the pilot acknowledges that the location is appropriate for his or her personal vision. In some embodiments, the cues are provided closer to the central view 402 (FIG. 4) in high stress situations or high G-force situations where tunnel vision is possible.

While the detailed drawings, specific examples, detailed algorithms and particular configurations given describe preferred and exemplary embodiments, they serve the purpose of illustration only. For example, the methods may be performed in any of a variety of sequence of steps. The hardware, optical and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

Some embodiments within the scope of the inventive concepts disclosed herein may include program products comprising machine-readable storage media for carrying or having machine-executable instructions or data structures stored thereon. Such machine-readable storage media can be any available media which can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

What is claimed is:

1. A display system for a vehicle, the display system comprising:
    a display configured to be worn by a user; and
    a computer operably coupled with the display and configured to cause the display to provide at least one visual cue in a peripheral vision area with respect to a forward looking field of view of the user through the display, wherein the display has a central axis with viewing angle ranges disposed about the central axis, wherein the viewing angle ranges comprise ring shaped non-peripheral viewing angle ranges between 0 and 8 degrees and ring shaped peripheral viewing angle ranges between 8 and 60 degrees, wherein the peripheral vision area is an arcuate portion on the display in a viewing angle range between 60 and 90 degrees, wherein the visual cue comprises a first symbol on a left side of the display and a second symbol on a right side of the display, the first symbol and the second symbol being provided completely within the arcuate portion, and being shaped according to the arcuate portion, and wherein the first symbol extends through a first quadrant of the display below a horizontal axis and a second quadrant of the display above the horizontal axis, wherein the second symbol extends through a third quadrant of the display below the horizontal axis and a fourth quadrant of the display above the horizontal axis, wherein the first symbol has a first arcuate border extending from the first quadrant to the second quadrant, wherein the second symbol has a second arcuate border extending from the third quadrant to the fourth quadrant, wherein the visual cue defines a vehicle orientation in an environment.

2. The display system of claim 1, wherein the visual cue is provided in a viewing angle range between 60 and 70 degrees relative to the central axis.

3. The display system of claim 1, wherein the the first symbol and the second symbol each comprise arrows.

4. The display system of claim 1, wherein the peripheral vision area is ring shaped.

5. The display system of claim 1, wherein the peripheral vision area is in a ring shape with a truncated portion at a top of the display.

6. The display system of claim 1, wherein the visual cue is flashed at a frequency corresponding to a magnitude of a warning.

7. The display system of claim 1, wherein the at least one visual cue comprises an arrowhead.

8. The display system of claim 7, wherein the at least one visual cue has a size that dynamically grows at a frequency between 0.1 to 10 seconds corresponding to a warning associated with the at least one visual cue, wherein a magnitude of the frequency corresponds to a magnitude of the warning.

9. The display system of claim 1, wherein the at least one visual cue extends from at least one of a top of the display and a bottom of the display, depending upon a positional nature of a warning associated with the at least one visual cue.

10. A method of providing a visual cue using a display system having a display configured to be worn by a user, the method comprising:
determining a warning condition associated with a position of a vehicle; and
providing at least one visual cue on the display, wherein the at least one visual cue is provided in a peripheral vision area of the display with respect to a forward looking field of view of the user through the display, wherein the display has a central axis with viewing angle ranges disposed about the central axis, wherein the peripheral vision area is an arcuate portion on the display in a viewing angle range between 60 and 90 degrees, wherein the visual cue comprises a first symbol on a left side of the display and a second symbol on a right side of the display, the first symbol and the second symbol being provided completely within the arcuate portion, and being shaped according to the arcuate portion, and wherein the first symbol extends through a first quadrant of the display below a horizontal axis and a second quadrant of the display above the horizontal axis, wherein the second symbol extends through a third quadrant of the display below the horizontal axis and a fourth quadrant of the display above the horizontal axis, wherein the first symbol has a first arcuate border extending from the first quadrant to the second quadrant, wherein the second symbol has a second arcuate border extending from the third quadrant to the fourth quadrant, wherein the visual cue defines a vehicle orientation in an environment.

11. The method of claim 10, wherein the vehicle is an aircraft.

12. The method of claim 10, wherein the at least one visual cue has a size that changes over time to indicate a position correction associated with the warning condition.

13. The method of claim 12, wherein the visual cue is provided in an arc within a viewing angle range of viewing angle ranges with respect to the forward looking field of view and the size is contained within the viewing angle range as the size changes over time.

14. The method of claim 12, wherein the visual cue is provided on a top or a bottom of the display towards a center of the display.

15. A display system for a vehicle, comprising:
a projector;
a display configured to be worn by a user, the display including a combiner in optical communication with the projector; and
a processor coupled with the projector and configured to cause the projector to project at least one visual cue related to position or movement of the vehicle to a peripheral vision area of the combiner associated with a forward field of view of the user through the combiner, wherein the display has a central axis with viewing angle ranges disposed about the central axis, wherein the peripheral vision area is an arcuate portion on the display in a viewing angle range between 60 and 90 degrees, wherein the visual cue comprises a first symbol on a left side of the display and a second symbol on a right side of the display, the first symbol and the second symbol being provided completely within the arcuate portion, and being shaped according to the arcuate portion, and wherein the first symbol extends through a first quadrant of the display below a horizontal axis and a second quadrant of the display above the horizontal axis, wherein the second symbol extends through a third quadrant of the display below the horizontal axis and a fourth quadrant of the display above the horizontal axis, wherein the first symbol has a first arcuate border extending from the first quadrant to the second quadrant, wherein the second symbol has a second arcuate border extending from the third quadrant to the fourth quadrant, wherein the visual cue defines a vehicle orientation in an environment.

16. The display system of claim 15, further comprising a tracker, wherein the processor is configured to cause the projector to provide conformal images in a central vision area outside of the peripheral vision area of the combiner using the tracker.

17. The display system of claim 15, wherein the at least one visual cue is at least one of: an up alert and a down alert.

18. The display system of claim 15, wherein the at least one visual cue is at least one of: a rotate left alert and a rotate right alert.

19. The display system of claim 15, wherein the at least one visual cue is at least one of: a below exclusion alert and an above exclusion alert.

20. The display system of claim 15, wherein the at least one visual cue is selected from: a below left exclusion alert, a below right exclusion alert, an above left exclusion alert, and an above right exclusion alert.

\* \* \* \* \*